April 2, 1957 F. A. MORRIS 2,787,780
CODE DETECTING SYSTEM
Filed Nov. 15, 1955
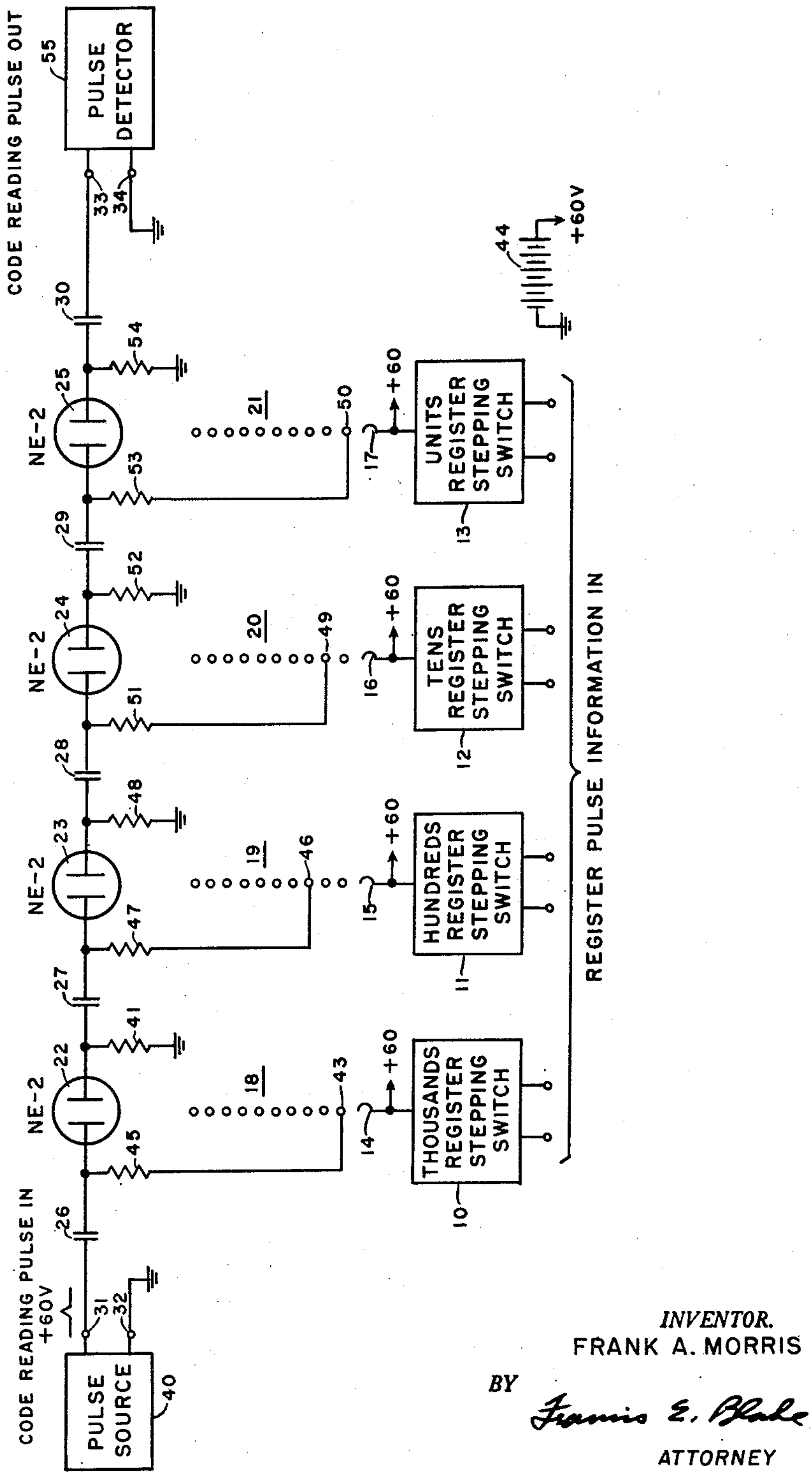
INVENTOR.
FRANK A. MORRIS
BY Francis E. Blake
ATTORNEY

United States Patent Office 2,787,780

Patented Apr. 2, 1957

2,787,780

CODE DETECTING SYSTEM

Frank A. Morris, Fishers, N. Y., assignor to General Dynamics Corporation, a corporation of Delaware

Application November 15, 1955, Serial No. 546,947

5 Claims. (Cl. 340—173)

The present invention relates to a code detecting system and more particularly to an electronic code detecting system especially useful for detecting a condition or conditions representing a multi-character code.

For many reasons, it often is necessary to initiate a function as a result of detecting the registration of a multi-character code in a suitable registration system. Often the multi-character code to be detected will be registered randomly and interspersed among many other registrations of multi-character codes of which there is no desire to detect. For example, the nation-wide toll dialing systems now being built may often require the recognition of certain area and office code combinations for purposes of routing the call and determining rates to be applied. In such systems, the office and area code may be in the form of electrical impulses representing digit values. Assuming a four digit code, only a few of the possible many different codes would be required to be detected.

It is an object of the present invention to provide a simplified means for detecting the registration of a multi-character code.

Another object of the invention is to provide a simplified electronic means for quickly and easily detecting the registration of a multi-character code as may be represented by a plurality of series of electrical impulses for each code character.

Further objects and advantages of the invention will be apparent with reference to the following specification and drawing in which the sole figure is a schematic wiring diagram with certain well known elements shown in block outline only.

Referring to the drawing, the invention will be specifically described in connection with a form thereof adapted to detect the registration of a four character code in which each code character may be a digit represented by a like number of electrical impulses. Obviously the invention may be used with any number of code characters and the code characters may themselves be in any form suitable for registration by conventional registration means. In order to simplify the description of the present invention, the code registers are shown as electric stepping switches 10, 11, 12 and 13, one each for the respective thousands, hundreds, tens and units digits of the four digit code to be registered and detected. The stepping switches 10—13 may be of any conventional form having brushes 14—17, respectively, to be stepped into engagement with contact banks, generally shown at 18—21, respectively, in response to each electric impulse connected thereto in a series of impulses for each digit. The sources of the code character electrical impulses are not shown and it should be understood that they may be obtained in any suitable manner. Of course, electronic counting tube register circuits or the like may be used instead of the stepping switches as shown, and the code may be registered in various manners such as by decimal or binary methods or the like.

Controllable conducting devices 22—25 are connected in series with coupling condensers 26—30 between input terminals 31, 32 and output terminals 33, 34. The controllable conducting devices 22—25, for purposes of the present description, are shown to be the commercially available neon diode gas tubes of the type identified as NE-2. A characteristic of such neon diode is that a minimum threshold voltage of about eighty volts amplitude must be applied across the respective pair of electrodes of the diode before the diode will become conductive by ionization of its gas content. Obviously, any other form of controllable conducting device which requires a minimum threshold voltage before allowing conduction may be used in place of the NE-2 type of neon diode gas tubes specifically described.

A source of code reading pulses having, for example, an amplitude of plus sixty volts is shown at 40 to be connected to the input terminals 31 and 32 with the terminal 32 grounded. The arrangement is such that the code reading pulse from the pulse source 40 may be connected through the coupling condenser 26 and across the neon diode 22 in series with the resistor 41 to ground. However, as previously mentioned, a minimum threshold voltage of about eighty volts is required to cause the neon diode 22 to become conductive and therefore the connection of a code reading pulse having a sixty volt amplitude from the pulse source 40 will not cause the diode 22 to conduct and its passage to the output terminals 33, 34 is blocked.

Assuming that a code character digit "1" representing the thousands digit has been registered in the thousands registration switch 10, the stepping switch brush 14 will be resting on the stepping switch terminal bank contact 43. It will be noted that each of the stepping switch brushes 14—17 is connetced to the positive terminal of a sixty volt bias source shown as a direct current battery 44 whose negative terminal is connected to ground. Although the bias source 44 is stated to have a potential of about sixty volts, it should be understood that its potential may be of any value lower than the minimum threshold voltage for the diodes 22—25 and not less than a value that will add to the value of the read pulse voltage to equal or exceed the threshold voltage. Therefore, with the stepping brush 14 resting on the stepping switch terminal 43, a sixty volt bias will be connected through the pulse isolating resistor 45 and across the pair of electrodes of the neon diode gate tube 22. Under such conditions, the application of a code reading pulse also having a sixty volt amplitude from the pulse source 40 will add to the bias voltage across the pair of electrodes of the neon diode gate 22 and equal the threshold voltage of diode 22 to cause such diode to become conductive to thereby transmit the code reading pulse through the coupling condenser 27 to the electrodes of the next neon diode tube gate 23 that is associated with the hundreds stepping switch 11. The amplitude of the pulse as transmitted through diode 22 and through the coupling condenser 27 is again approximately sixty volts due to the voltage drop in the diode 22. If the hundreds stepping switch 11 has registered the three impulses of the code character "3" of the hundreds digit, its switch brush 15 will be resting on the stepping switch terminal 46 to apply the sixty volt bias voltage through the pulse isolating resistance 47 across the pair of electrodes of the neon diode tube gate 23 and the aforementioned code reading pulse as transmitted through condenser 26, diode 22, and condenser 27 will also be conducted through diode 23 to ground through resistance 48 and be coupled by condenser 28 to the diode gate 24.

Similarly, if the tens register stepping switch 12 has been stepped to the stepping switch terminal 49 and the units register switch has been stepped to the stepping switch terminal 50, the neon diode gates 24 and 25 will also be biased through isolating resistances 51 and 53, respectively, to become conductive when the code reading pulse is applied thereto. It should now be apparent that a code reading pulse can be transmitted from the pulse source 40 through the series connected diode gates 22—25 and the associated coupling condensers 26—30 to the code reading pulse detector 55 whenever the impulse responsive stepping switches 10—13 for registering the respective code characters have registered the particular code characters to be detected, as indicated by the connections of the associated stepping switch terminals such as 43, 46, 49 and 50 to the associated diode gate tubes 22—25.

In the form of the invention that has been specifically described above, connections were shown to stepping switch terminals 43, 46, 49 and 50 which would enable the multi-character code detecting system of the invention to detect the registration of the code "1321." Obviously, by changing the respective connections of the diode gate tubes 22—25 to different terminals of the associated stepping switches 10—13, a different multi-character code may be detected. The pulse detector 55 has not been specifically described and it should be understood that any suitable indicating, detecting, or pulse utilization device may be employed.

Various modifications may be made within the spirit of the invention and the scope of the appended claims.

What is claimed is:

1. A multi-character code detecting gate system comprising, controllable conducting means for each character of the code to be detected, each of said conducting means requiring a minimum threshold voltage thereacross for conduction, code reading pulse input terminals, code reading pulse output terminals, means for connecting each of said conducting means in series between said input and output terminals, a source of code reading pulses having a predetermined voltage amplitude that is lower than said minimum threshold voltage, a register device for each character of the code, a bias voltage source having a voltage amplitude less than said threshold voltage and sufficient to at least equal said threshold voltage when added to said reading pulse voltage, means interconnecting a respective register and a respective conducting means and responsive to the registration of a predetermined character to connect said bias voltage across the respective conducting means in a manner to add to the voltage amplitude of a code reading pulse to be applied, and means for connecting a code reading pulse to said input terminals whereby said pulse may be transmitted through the series connected conducting means to said output terminals to detect a predeermined combination of characters as registered in all of said registers.

2. A multi-character code detecting gate system comprising, a diode for each character of the code to be detected, each of said diodes having a pair of electrodes requiring a minimum threshold voltage thereacross for conduction, code reading pulse input terminals, code reading pulse output terminals, means for connecting each of said diodes in series between said input and output terminals, a source of code reading pulses having a predetermined voltage amplitude that is lower than said minimum threshold voltage, a register device for each character of the code, a bias voltage source having a voltage amplitude less than said threshold voltage and sufficient to at least equal said threshold voltage when added to said reading pulse voltage, means interconnecting a respective register and a respective diode and responsive to the registration of a predetermined character to connect said bias voltage across the electrodes of the diode in a manner to add to the voltage amplitude of a code reading pulse to be applied, and means for connecting a code reading pulse to said input terminals whereby said pulse may be transmitted through the series connected diodes to said output terminals to detect a predetermined combination of characters as registered in all of said registers.

3. A multi-character code detecting gate system comprising, a gas tube diode for each character of the code to be detected, each of said diodes having a pair of electrodes requiring a minimum threshold voltage thereacross for conduction, code reading pulse input terminals, code reading pulse output terminals, means for connecting each of said diodes in series between said input and output terminals, a source of code reading pulses having a predetermined voltage amplitude that is lower than said minimum threshold voltage, a register device for each character of the code, a bias voltage source having a voltage amplitude less than said threshold voltage and sufficient to at least equal said threshold voltage when added to said reading pulse voltage, means interconnecting a respective register and a respective diode and responsive to the registration of a predetermined character to connect said bias voltage across the electrodes of the diode in a manner to add to the voltage amplitude of a code reading pulse to be applied, and means for connecting a code reading pulse to said input terminals whereby said pulse may be transmitted through the series connected diodes to said output terminals to detect a predetermined combination of characters as registered in all of said registers.

4. A multi-character code detecting gate system comprising, a gas tube diode for each character of the code to be detected, each of said diodes having a pair of electrodes requiring a minimum threshold voltage thereacross for conduction, code reading pulse input terminals, code reading pulse output terminals, means for connecting each of said diodes in series between said input and output terminals and including coupling condensers between the input terminals and each diode to the output terminals, a source of code reading pulses having a predetermined voltage amplitude that is lower than said minimum threshold voltage, a register device for each character of the code, a bias voltage source having a voltage amplitude less than said threshold voltage and sufficient to at least equal said threshold voltage when added to said reading pulse voltage, means interconnecting a respective register and a respective diode and responsive to the registration of a predetermined character to connect said bias voltage across the electrodes of the diode in a manner to add to the voltage amplitude of a code reading pulse to be applied, and means for connecting a code reading pulse to said input terminals whereby said pulse may be transmitted through the series connected coupling condensers and diodes to said output terminals to detect a predetermined combination of characters as registered in all of said registers.

5. A multi-character code detecting gate system comprising, a gas tube diode for each character of the code to be detected, each of said diodes having a pair of electrodes requiring a minimum threshold voltage thereacross for conduction, code reading pulse input terminals, code reading pulse output terminals, means for connecting each of said diodes in series between said input and output terminals and including coupling condensers between the input terminals and each diode to the output terminals, a source of code reading pulses having a predetermined voltage amplitude that is lower than said minimum threshold voltage, a register device for each character of the code, a bias voltage source having a voltage amplitude less than said threshold voltage and sufficient to at least equal said threshold voltage when added to said reading pulse voltage, means interconnecting a respective register and a respective diode and responsive to the registration of a predetermined character for connecting said bias voltage across the electrodes of the diode in a manner to add to the voltage amplitude of a code reading pulse to be applied, means for connecting a code reading pulse to said input terminals whereby said pulse may be transmitted through the series connected coupling condensers and diodes to said output terminals to detect a predetermined combination of characters as registered in all of said registers, and means for isolating the code reading pulses from said bias voltage source.

References Cited in the file of this patent

UNITED STATES PATENTS 2,401,729 Goldsmith ............ June 11, 1946